United States Patent [19]
Geiser et al.

[11] Patent Number: 5,367,928
[45] Date of Patent: Nov. 29, 1994

[54] METHOD OF AND IMPLEMENT FOR CUTTING BOOKS AT THE BACKBONES

[75] Inventors: Peter Geiser, Matzingen; Rolf Zängerle, Herdern, both of Switzerland

[73] Assignee: Grapha-Holding AG, Hergiswil, Switzerland

[21] Appl. No.: 961,084

[22] Filed: Oct. 14, 1992

[30] Foreign Application Priority Data

Oct. 18, 1991 [CH] Switzerland .......... 3058/91

[51] Int. Cl.⁵ .......... B26D 1/143; B41F 13/56
[52] U.S. Cl. .......... 83/49; 83/13; 83/676; 83/677; 83/844; 83/934
[58] Field of Search .......... 83/13, 49, 51, 493, 83/494, 835, 837, 666, 676, 677, 934, 844

[56] References Cited

U.S. PATENT DOCUMENTS

| | | | |
|---|---|---|---|
| 3,726,167 | 4/1973 | Barbour | 83/37 |
| 3,860,158 | 1/1975 | Aspinwall | 83/837 |
| 3,990,337 | 11/1976 | Barbour, Jr. | 83/934 |
| 4,480,518 | 11/1984 | Futterer | 83/934 |
| 4,784,029 | 11/1988 | Gebelius | 83/13 |
| 4,840,098 | 6/1989 | Gammeler | 83/676 |

FOREIGN PATENT DOCUMENTS 0017878 10/1980 European Pat. Off. .......... 83/493

Primary Examiner—Hien H. Phan
Attorney, Agent, or Firm—Darby & Darby

[57] ABSTRACT

The backbones of successive stacks of signatures of a series of such stacks are trimmed by a rotary implement having two annuli of substantially radially extending orbiting trimming or cutting tools. The tools of one annulus extend radially outwardly beyond the tools of the other annulus, and the tools of one annulus extend axially forwardly beyond the tools of the other annulus. The tools which extend axially forwardly beyond the other tools orbit at a higher speed. The two annuli of tools can be orbited in the same direction or in opposite directions.

14 Claims, 3 Drawing Sheets

METHOD OF AND IMPLEMENT FOR CUTTING BOOKS AT THE BACKBONES

BACKGROUND OF THE INVENTION

The invention relates to improvements in methods of and in implements for cutting or trimming books and/or similar stacks of overlapping sheets. More particularly, the invention relates to improvements in methods of and in implements for removing surplus material from selected sides of stacks of overlapping sheets of paper or the like.

The quality of treatment of the backbone of a book is of considerable importance for the acceptability of the finished product, be it a magazine, a brochure, a pamphlet or a book (hereinafter book for short). Thus, satisfactory treatment of the backbone can prolong the useful life of the book. For example, if the backbone is to be adhesively secured to the corresponding portion of a book cover, a cutting or trimming treatment which involves withdrawal of fibers from the backbone can enlarge the area of contact between the cover and the treated side of the book. An additional important requirement is the accuracy of treatment, i.e., the exact dimensions of the product which is left subsequent to cutting or trimming. As a rule, a stack of sheets (such as an accumulation of signatures which are to form the pages or sheets of a book) is confined between two clamps or between the jaws of tongs and is transported, as one of a series of such stacks, along a predetermined path through a trimming or cutting station. The clamps or jaws (hereinafter clamps) must grasp the two outermost sheets of the stack without any slippage; at the same time, the clamps should not exert an excessive pressure against the adjacent sheets because this could result in the development of a mushroom-like outwardly bulging portion (signature folds) at the backbone and would necessitate removal of a larger quantity of material by the cutting or trimming implement. Removal of the outwardly bulging portion results in unsatisfactory configuration of the trimmed backbone and in a reduction of the effective area of the trimmed side with attendant establishment of a relatively weak connection between the thus treated side and the cover. Moreover, unsatisfactory cutting or trimming of the backbone of a stack of signatures can affect the appearance of the finished book.

OBJECTS OF THE INVENTION

An object of the invention is to provide a novel and improved method of removing material from one side of a stack of overlapping sheets of paper or the like in such a way that the treated side is in an optimal condition for attachment to a book cover or the like.

Another object of the invention is to provide a novel and improved multi-stage method of removing material from selected sides of stacks of overlapping paper sheets or the like.

A further object of the invention is to provide a method which renders it possible to ensure uniform treatment of short or long series of successive stacks of overlapping sheets.

An additional object of the invention is to provide a method which renders it possible to remove surplus material from selected sides of successive stacks of overlapping sheets at a high frequency and to limit the quantity of removed material to a minimum.

Still another object of the invention is to provide a novel and improved implement which can be utilized for the practice of the above outlined method.

A further object of the invention is to provide the implement with novel and improved arrays of material removing tools.

Another object of the invention is to provide an implement which can remove surplus material in stages to thus avoid overstressing of the tools and to obviate the need for excessive compacting of the stack during transport through the cutting or trimming station.

An additional object of the invention is to provide a novel and improved combination of material removing implements which can be utilized for the practice of the above outlined method.

Still another object of the invention is to provide an implement or a set of implements which can be rapidly adjusted for use in connection with the trimming of thicker or thinner stacks of overlapping sheets of paper or the like.

A further object of the invention is to provide an implement or a set of implements wherein selected parts can be removed for inspection, repair or replacement without necessitating even partial dismantling of the remaining part or parts of the implement or implements.

SUMMARY OF THE INVENTION

One feature of the present invention resides in the provision of a method of removing material from one side of a stack of overlapping sheets, such as paper sheets, with a plurality of cutters which orbit about a predetermined axis. The improved method comprises the steps of effecting a movement of the one side of the stack and the cutters relative to each other along a path wherein the cutters penetrate into the stack at the one side of such stack, orbiting one of the cutters at a first speed; and orbiting another cutter of the plurality of cutters at a different second speed. The stack can contain overlapping signatures and the one side of the stack can be disposed at its backbone, i.e., in the region where the trimmed stack can be bonded to the foldable portion between the front and rear panels of a book cover. If the first speed exceeds the second speed, the method preferably further comprises the step of staggering the cutters substantially transversely of the path so that the one cutter penetrates into the stack ahead of the other cutter. The orbiting steps can include orbiting the cutters about the predetermined axis in the same direction. Alternatively, one of the orbiting steps can include orbiting the respective cutter about the predetermined axis in a first direction and the other orbiting step can include orbiting the respective cutter in a second direction counter to the first direction. The method preferably further comprises the step of providing at least one of the cutters with an annulus of tools which are spaced apart from each other around the predetermined axis.

Another feature of the invention resides in the provision of a material removing implement for use in an apparatus for trimming one side of each of a series of stacks of overlapping sheets wherein the stacks of the series are advanced in a predetermined direction so that the sides of the advancing stacks are located in a predetermined path. The improved implement serves to remove material from the sides of successive stacks of the series in a predetermined portion of the path and includes a plurality of cutters, means for orbiting one of the cutters along a first endless path about a predetermined axis, and means for orbiting another cutter of the plurality of cutters about the predetermined axis along a different second endless path. If the endless paths are circular paths, they have different radii. Each cutter can comprise an annulus of tools, and the centers of such annuli can be located on the predetermined axis. Still further, the implement can comprise at least one rotary carrier for the orbiting means. The one cutter can be offset relative to the other cutter in the direction of the predetermined axis, and the implement can further comprise means for separably coupling the tools of at least one of the cutters to the at least one carrier. Such means for separably coupling the tools of at least one of the cutters to the at least one carrier can be provided in addition to or can constitute means for adjustably coupling at least one of the cutters to the at least one carrier. The at least one cutter which is adjustably coupled to the at least one carrier can comprise an annulus of shanks and bits or tools provided on the shanks and having cutting edges. The means for adjustably coupling such cutter to the at least one carrier can comprise slots in the shanks and fasteners extending with clearance through the slots and being affixed to the at least one carrier.

Each cutter can include an annulus of neighboring tools having mutually inclined cutting edges which are substantially or exactly parallel to and are located behind (as seen in the direction of orbital movement of the respective cutters) planes including the predetermined axis.

The implement can be constructed and assembled in such a way that it includes a substantially disc-shaped first carrier for one of the orbiting means and a substantially annular second carrier for the other orbiting means. The second carrier can at least partially surround the first carrier. Such implement can further comprise means for rotating the two carriers about the predetermined axis in the same direction or in opposite directions.

A further feature of the invention resides in the provision of an implement as a means for trimming one side of each of a series of stacks of overlapping sheets wherein the stacks of the series are advanced in a predetermined direction so that the sides of the advancing stacks are located in a predetermined path. The improved implement serves to remove material from the sides of successive stacks while the sides are located in the predetermined path, and the implement comprises a first rotary carrier at one side of the path, a second rotary carrier at the other side of the path substantially opposite the first carrier, a first annulus of severing tools provided on and orbitable by the first carrier along a first endless path, and a second annulus of severing tools provided on and orbitable by the second carrier along a second endless path. The two endless paths have coplanar common sections which overlie the predetermined path. Such implement further comprises means for rotating the carriers (i.e., for orbiting the first and second annuli of severing tools) in opposite directions. The tools of the two annuli can extend substantially radially outwardly of the respective carriers, and the tools of one of the annuli mate with the tools of the other annulus in the common sections of the two endless paths. Such common sections of the two endless paths can be elongated in the predetermined direction.

The maximum width of the common sections of the two endless paths can be selected in such a way that it equals or approximates the width of the sides of the stacks (as measured transversely of the predetermined paths. This can be achieved in a simple and effective manner by providing the implement with means for adjusting at least one of the carriers at least substantially transversely of the predetermined direction. If the stacks of the series of stacks include stacks having wider sides and stacks having narrower sides, the aforementioned means for adjusting at least one of the carriers substantially transversely of the predetermined direction can be designed to carry out the adjustments in dependency on the width of the sides which advance along the predetermined path. For example, the width of the sides of the oncoming stacks can be monitored, and the signals which are generated by the monitoring means can be used to automatically adjust at least one of the carriers transversely of the direction of advancement of stacks relative to the implement.

The adjustments of at least one of the carriers transversely of the predetermined direction can be selected in such a way that the common sections of the two endless paths have an area which is at least substantially uniform in the predetermined direction and/or transversely of such direction.

The novel features which are considered as characteristic of the invention are set forth in particular in the appended claims. The improved implement itself, however, both as to its construction and the mode of using the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
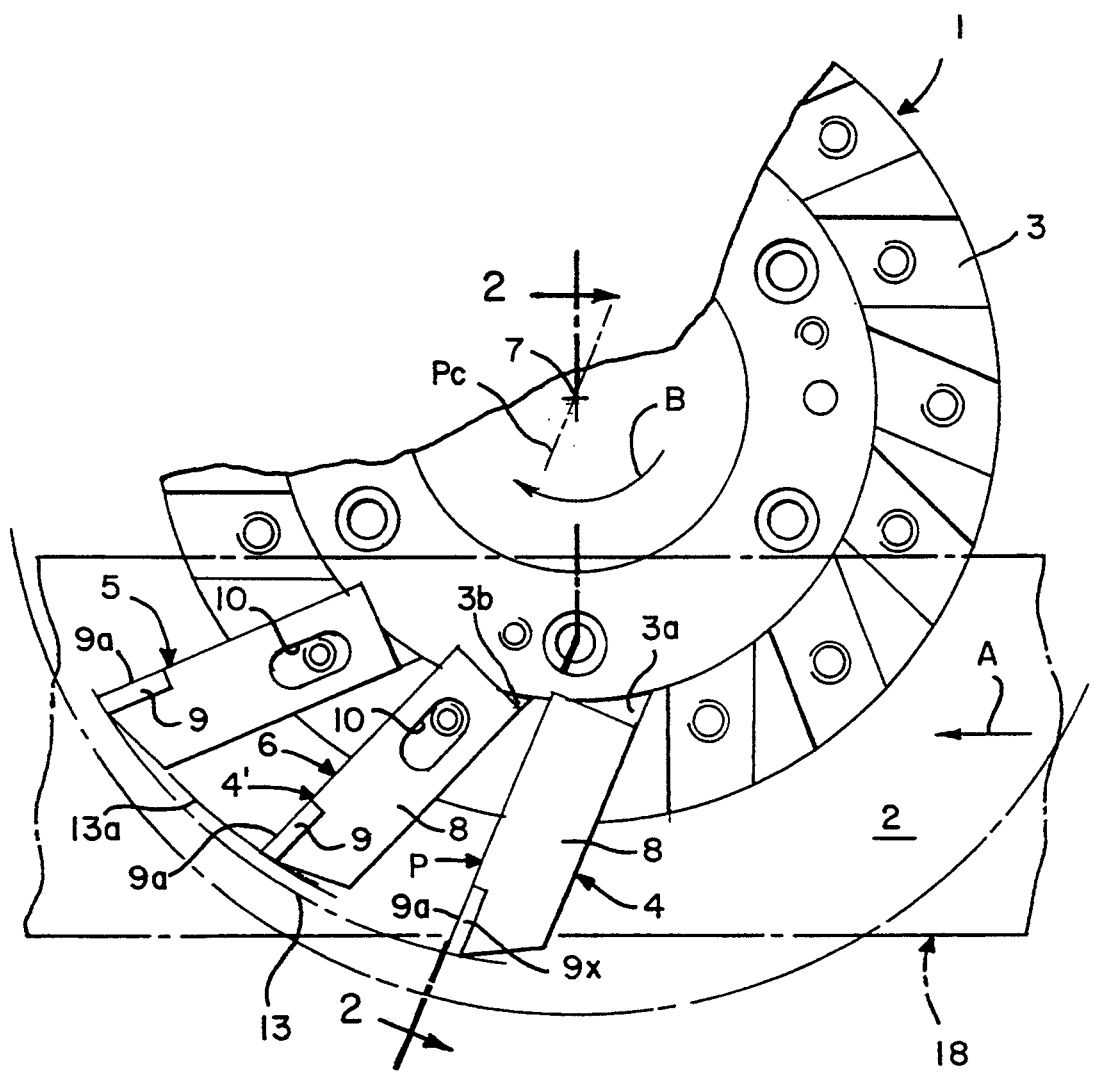
FIG. 1 is a fragmentary front elevational view of an implement which embodies one form of the present invention.
Figure 2:
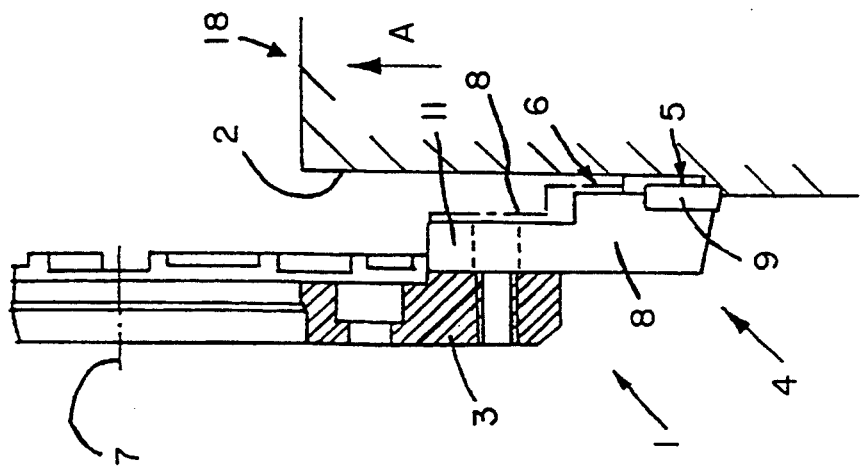
FIG. 2 is a sectional view substantially as seen in the direction of arrows from the line II—II in FIG. 1.

FIGS. 1 and 2 show a material removing implement 1 which is constructed in accordance with a first embodiment of the present invention. The implement 1 is shown in the process of removing material (such as paper) from the adjacent side (backside) 2 of a stack 18 of overlapping sheets which advances in the direction of arrow A. The implement 1 comprises a substantially disc-shaped carrier 3 which is driven in the direction of arrow B to rotate about an axis 7. The axis 7 is stationary and is normal to the plane of the sides 2 of the stacks 18 advancing in the direction of arrow A. The means for engaging and entraining the stacks 18 includes clamps, e.g., of the type described and shown in U.S. Pat. No. 3,726,167 granted Apr. 10, 1973 to Barbour for "Method of cutting thick books". The disclosure of Barbour is incorporated herein by reference. The carrier 3 supports two composite cutters 5 and 6 each of which comprises an annulus of discrete tools or bits 9 distributed about the axis 7. The tools 9 of the cutter 5 are orbited about the axis 7 by discrete orbiting units 4, and similar orbiting units 4' are provided to orbit the tools 9 of the cutter 6 about the axis 7 in response to rotation of the carrier 3 in the direction of arrow B. Each orbiting unit 4 or 4' comprises a shank or arm 8 which is adjustably coupled to the carrier 3 and is welded with the respective tool or bit 9 at a location radially outwardly of the carrier 3.

That side of the carrier 3 which faces the sides 2 of the advancing stacks 18 is provided with a first set of recesses 3a for the radially inner portions 11 of shanks or arms 8 forming part of the orbiting means 4, and with a second set of recesses 3b for the radially inner portions 11 of shanks or arms 8 forming part of the orbiting means 4' for the cutter 6. The means for adjustably coupling the arms or shanks 8 to the carrier 3 comprises threaded fasteners 10a (FIG. 4) which extend through elongated slots 10 in the radially inner portions 11 of the respective shanks 8. The cutting edges 9a of the tools 9 forming part of the cutter 5 are disposed in a first plane, and the cutting edges 9a of tools 9 forming part of the cutter 6 are located in a second plane. These planes are parallel to each other and are normal to the axis 7. The tools 9 of the cutter 5 are more distant from the axis 7 than the tools 9 of the cutter 6; therefore, the tangential speed of movement of the tools 9 of the cutter 5 exceeds the tangential speed of movement of the other tools 9 (of the cutter 6). The radially outermost portions or tips of the cutting edges 9a of tools 9 forming part of the cutter 5 advance along an arcuate path 13, and the radially outermost portions of the cutting edges 9a of tools 9 forming part of the cutter 6 advance along an arcuate path 13a having a diameter somewhat smaller than the diameter of the path 13.

The cutting edges 9a are located in planes which are parallel to and are located behind planes that intersect the axis 7. For example, the cutting edge 9a of the tool marked 9x is located in a plane P parallel to and disposed behind (as seen in the direction of arrow B) a plane Pc including the axis 7 of rotation of the carrier 3.

FIG. 2 shows that the tools 9 of the composite cutter 5 remove material from an advancing stack 18 during a first stage of material removal and that the tools 9 of the composite cutter 6 remove material during a next-following second stage, i.e., the two cutters remove two layers of material and their material removing action is felt all the way across the entire side 2 of each advancing stack 18.

The tools 9 can be made of standard tool steel or other suitable material, and each of these tools can be welded or otherwise bonded to the respective shanks 8. The slots 10 in the radially innermost portions 11 of the respective shanks 8 extend substantially radially of the carrier 3 and render it possible to move the tools 9 of the cutter 5 and/or 6 nearer to or further away from the axis 7.

An advantage of the implement 1 is that a smaller specific force must be applied to trim the sides 2 of successive stacks 18, especially if the stacks are relatively thick. Such reduction of specific force is possible because the removal of surplus material at the sides 2 of successive stacks 18 takes place in two rapidly following stages. This reduces the likelihood of excessive deformation of the stacks 18 along their sides 2 even if the advancing or transporting clamps subject the stacks 18 to highly pronounced compressive stresses which normally result in the development of large bulges or protuberances extending rearwardly beyond the desired or optimal planes of the backbones. The extent of deforming action upon the backbone of a stack 18 which is not subjected to very pronounced compressive stresses is also reduced due to the provision of a two-stage surplus removing step, first by the cutting edges 9a of tools or bits 9 forming part of the composite cutter 6 and thereupon by the cutting edges 9a of tools or bits 9 forming part of the composite cutter 5. The speed of orbital movement of the tools 9 forming part of the cutter 5 exceeds the speed of orbital movement of tools 9 forming part of the cutter 6.

The person in charge can select the ratio of speed of orbital movement of tools 9 forming part of the composite cutter 5 to the speed of orbital movement of tools forming part of the cutter 6. For example, the arrangement may be such that slots 10 are provided only in the shanks 8 for the tools 9 of the cutter 5 or only in the shanks 8 for the tools 9 of the cutter 6. Furthermore, the person in charge can move the tools 9 of the cutter 5 and/or 6 radially toward or away from the axis of the carrier 3 in order to compensate for differences in the width of the backbones of successively treated series of stacks 18. It is presently preferred to provide each shank 8 with a slot 10, i.e., to ensure that each and every tool 9 can be adjusted in a direction toward or away from the axis 7 of the carrier 3.

The axial positions of the tools 9 forming part of the cutter 5 or 6 can be adjusted by placing washers, shims or analogous inserts into the respective recesses 3a and/or 3b.

Figure 4:
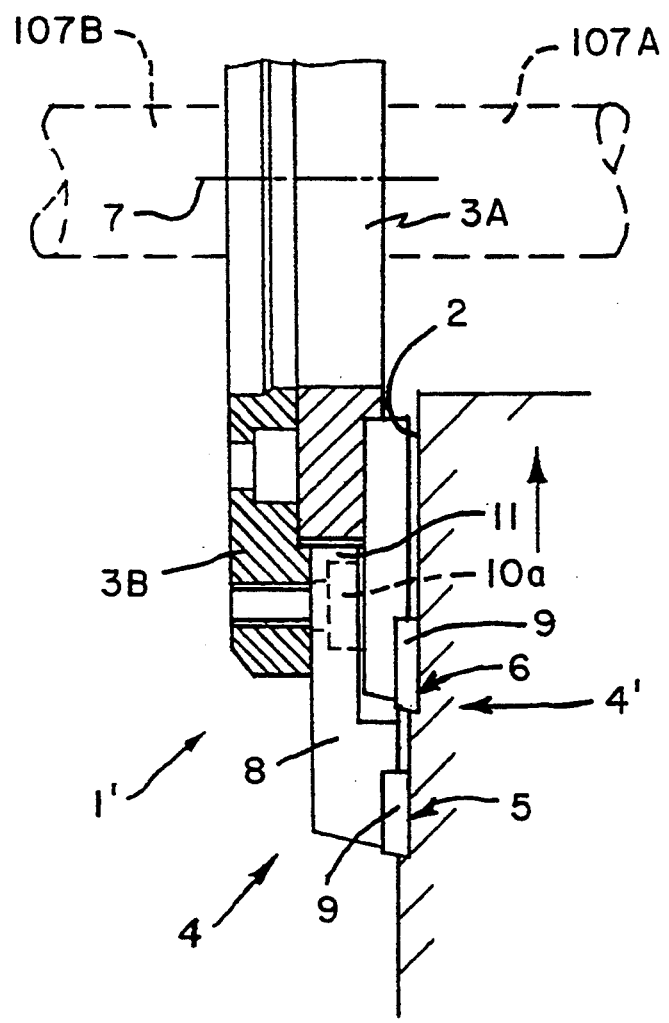
FIG. 4 is a transverse sectional view similar to that of FIG. 2 but showing an implement which constitutes a modification of the implement of FIG. 1.

FIG. 4 shows a portion of an implement 1' which constitutes a modification of the implement 1 of FIGS. 1 and 2. The carrier of this implement is a composite carrier including a substantially disc-shaped carrier 3A and a substantially annular or ring-shaped carrier 3B. The latter at least partially surrounds the carrier 3A. The tools 9 of the composite cutter 6 are mounted on the disc-shaped carrier 3A, and the tools 9 of the composite cutter 5 are mounted on the carrier 3B. Otherwise, the operation of the implement 1' is or can be the same as that of the implement 1. FIG. 4 further shows portions of two shafts 107A, 107B which respectively serve to rotate the carriers 3A, 3B (and hence the composite cutters 6 and 5) at the same speed, at different speeds, in the same direction, or in opposite directions.

An advantage of the implement 1' is that the possibility of rotating the carriers 3A, 3B in the same direction or in opposite directions and at selected speeds enables the person in charge to further conform the trimming or material removing action to the characteristics of the stacks 18 (e.g., the quality of the paper) and to the specifics of the apparatus which is used to transport the stacks 18 past the implement 1'.

Irrespective of whether the stacks 18 are trimmed by the implement 1 or by the implement 1', the undesirable effect upon the backbone of a stack 18 which is transported past the tools 9 while in highly compressed state (with a pronounced bulge at the side 2) is much less pronounced than by resorting to heretofore known implements.

Another advantage which is common to the implements 1 and 1' is that each such implement can trim a large number of stacks 18 per unit of time. This is due to the fact that the quality of a stack 18 which has advanced beyond the implement 1 or 1' is quite satisfactory even if the stacks are advanced at a high frequency (i.e., in large numbers per unit of time) so that it is not necessary to slow down the treatment in order to ensure that the trimming of the backbone of each of a short or long series of successive stacks 18 will be satisfactory. This, in turn, contributes to lower cost of the treatment and to lower cost of the ultimate products.

A further advantage which is common to the implements 1 and 1' is that the wear upon the individual tools 5 or bits 9 is less pronounced than in conventional implements. The reason is believed to be that the trimming operation is carried out in a plurality of successive stages so that none of the cutting edges 9a must remove large quantities of material. In addition, the number of the tools or bits 9 can be high or very high because such tools or bits are disposed in a plurality of parallel planes; this, too, contributes to a reduction of wear upon the cutting edges 9a of individual tools. Since the wear upon the tools is reduced, each such tool can be put to use for a relatively long interval of time. This contributes to a reduction of the frequency of the need for inspection, sharpening or replacement of the tools and thus reduces the total of down times of the apparatus employing the improved implement.

The wear upon the tools 9 can be reduced still further by reducing the depth of penetration of cutting edges 9a during each revolution of the carrier 3 or 3A, 3B and/or by maintaining the temperature of the tools at an optimum value or within an optimal range.

The second stage of the trimming operation can be said to constitute an equalizing or secondary trimming stage. Such secondary or equalizing trimming can be carried out practically simultaneously with the initial cutting or material removing step, i.e., it is not necessary to employ a discrete second implement which serves the sole purpose of equalizing that surface or side which has been trimmed by a preceding implement. This, too, contributes to lower cost of the apparatus which employs the improved implement 1 or 1'.

It is within the purview of the invention to increase the number of carriers which can rotate with or relative to each other to three or more.

Figure 3:
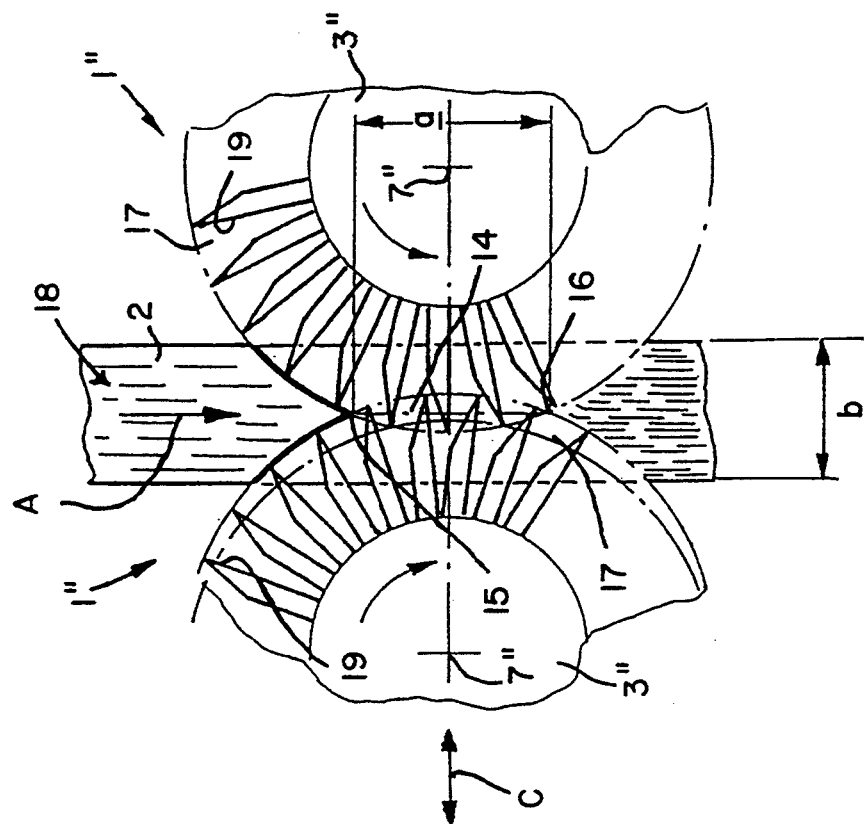
FIG. 3 is a fragmentary front elevational view of a two-piece implement which are in the process of removing surplus material from the backbone of a book.

FIG. 3 illustrates a trimming or cutting apparatus which employs two identical or similar rotary material removing implements 1". The illustrated implements 1" are mirror images of each other with reference to a plane which is located midway between their parallel axes 7". The carriers 3" of the implements 1" supports annuli of substantially radially extending cutting or material removing tools 19 with clearances 17 between neighboring tools. The paths of the two annuli of tools 19 overlap each other at 14, and the length of the common sections of the two paths is shown at a. Such sections extend in the direction (arrow A) of advancement of stacks 18 past the cutting or trimming station accommodating the implements 1". The width of the extent of overlap can be varied, e.g., so as to match or to approximate the width b of the side 2 of a stack 18 advancing past the material removing station. This can be achieved by moving at least one of the carriers 3" in one of the directions indicated by an arrow C. Such shifting of one or both carriers 3" results in a lengthening or shortening of the distance between the two ends 15, 16 of the overlapping sections of the paths of the two sets of tools 19. These tools can be said to mesh during advancement from the end 15 toward the end 16. The speed of the tools 19 on the carrier 3" of one of the implements 1" preferably matches the speed of the tools 19 on the other carrier 3". These carriers are rotated in opposite directions. The plane of the region of overlap of sections of the paths for the two sets of tools 19 is at least substantially normal to the plane including the axes 7" of the two carriers 3". The width of the region of overlap can be varied by changing the distance between the two axes 7" and/or by replacing the illustrated tools 19 with shorter or longer tools.

The composite implement of FIG. 3 exhibits the advantage that the individual tools 19 are called upon to remove relatively small quantities of material. In addition, the tools 19 of one of the implements 1" can be said to constitute equalizing or secondary trimming tools which enhance the quality of cuts made by the tools 19 of the other implement 1".

The apparatus which employs the structure of FIG. 3 can be designed to operate with two or more pairs of implements 1" or analogous implements.

Another important advantage of the composite implement of FIG. 3 is that the tools 19 of one of the implements 1" remove material from one marginal portion of the backbone toward the other marginal portion, and that the tools 19 of the other implement 1" remove material in a direction from the other marginal portion toward the one marginal portion of the backbone. This enhances the quality of finish of marginal portions at both sides of the treated backbone. Furthermore such trimming even further ensures that one set of tools 19 can eliminate any unevennesses which develop as a result of treatment of successive sides 2 by the other set of tools 19 and/or vice versa. Otherwise stated, one set of tools 19 can be said to equalize the surfaces which were trimmed by the other set of tools 19, and vice versa. This has been found to greatly enhance the quality of the finished backbones.

An advantage of the feature that the two carriers 3" of FIG. 3 are driven to rotate in opposite directions is that this simplifies the disposal of removed surplus material, normally paper. Thus, the direction of advancement of the stream of material which is removed by one set of tools 19 coincides with the direction of advancement of material which is being removed by the other set of tools 19. The two streams can merge, at least in part, to be directed into a common collecting receptacle or onto a single conveyor.

The feature that portions of tools 19 on one of the carriers 3" actually mate or intermesh with portions of tools 19 on the other carrier 3" of FIG. 3 exhibits the advantage that such distribution of tools contributes to a more intensive trimming and equalizing action. The length of the zone (14) where portions of one set of tools 19 mate with portions of tools 19 forming the other set can be varied in the aforedescribed manner, i.e., by moving the one or the other carrier 3" sideways in one of the directions indicated by the arrow C and/or by replacing the tools 19 of the one and/or the other annulus with shorter or longer tools and/or by adjusting the radial positions of the tools 19 with reference to the respective carriers 3".

It normally suffices to mount one of the carriers 3" for movement in directions which are indicated by the arrow C. The reason is that, in many trimming apparatus, the means for transporting stacks 18 along their path includes a fixed plate. The clamps or jaws which are used to grip the outermost sheets of successive stacks 18 advance along such stationary wall. If a relatively thin stack 18 is followed by a thicker stack, the central plane of such thicker stack is nearer to the one than to the other axis 7". Thus, adjustment of a single carrier 3" can suffice or suffices to compensate for such shifting of the central plane of a thicker stack 18 (or shifting of the central plane of a thinner stack in the opposite direction).

Highly satisfactory results are obtained if the width of the region or zone 14 of overlap at least equals the width b of the sides 2 of stacks 18 which are treated in the apparatus employing the implements 1" of FIG. 3. The results are even more satisfactory if at least a certain length of the zone 14 is constant in the direction of arrow A as well as transversely of such direction, e.g., by increasing the width of the zone of overlap beyond the width b. It is important to ensure that the width of the zone 14 is at least substantially uniformly distributed across the full width of the sides 2 of stacks 18 which are being treated by the tools 19 of FIG. 3.

An orientation of tools 19 in a manner as shown or similar to that shown in FIG. 3 exhibits the additional advantage that the removed surplus can be evacuated laterally beyond the marginal portions of the sides 2. This can be readily accomplished by properly selecting the orientation of tools 19 with reference to the corresponding carriers 3".

The formation of grooves at the locations of penetration of cutting edges of the tools 19 into the material at the sides 2 of successive stacks 18 can be eliminated or rendered less pronounced by properly inclining the planes of the tools 19 relative to the planes of the sides 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of removing material from the spine of book blocks of stacked sheet-like printed products with a first set of a plurality of cutters, each having a cutting edge, which rotate about a predetermined axis at a first rotational speed and a second set of a plurality of cutters, each having a cutting edge, which rotate about the predetermined axis at said first rotational speed, comprising the steps of rotating the cutting edges of the first set at a first radial distance spaced from said axis and rotating said cutting edges of the second set at a second radial distance spaced from said axis with said first radial distance being greater than the second radial distance and said cutting edges of the first set being axially spaced with respect to said cutting edges of the second set; effecting a movement of the spine of the book block and the cutters relative to each other along a path wherein the cutters penetrate into the spine of the book block of the stacked sheet-like printed products; removing material from the spine of the book blocks with the first set of the cutters removes a first layer of material from said stack and the second set of cutters successively removes a second layer of material from said stack.

2. The method of claim 1, wherein the stack contains overlapping signatures and has a backbone, the one side of the stack being provided on the backbone.

3. The method of claim 1, wherein the second orbiting speed exceeds the first orbiting speed and further comprising the step of staggering the first and second sets of cutters substantially transversely of the path so that the one cutter penetrates into the stack ahead of the other cutter.

4. The method of claim 1, wherein said orbiting steps include orbiting the cutters about said axis in the same direction.

5. The method of claim 1, further comprising the step of providing at least one of the cutters with an annulus of tools which are spaced apart from each other around said axis.

6. For use in an apparatus for trimming the spine of book blocks of stacked sheet-like printed products wherein the book blocks are advanced in a predetermined direction so that the spines of the advancing book blocks are located in a predetermined path, an implement rotating about a predetermined axis for removing material from the spine of successive book blocks that are being advanced, including a first set of a plurality of cutters, each having a cutting edge, which rotate about the predetermined axis and a second set of a plurality of cutters, each having a cutting edge, which rotate about the predetermined axis; the cutting edges of the first set being mounted at a first radial distance spaced from said axis and said cutting edges of the second set being mounted at a second radial distance spaced from said axis; said first radial distance is greater than said second radial distance and said cutting edges of the first set being axially spaced with respect to said cutting edges of the second set; means for rotating the implement during operation for removing material from the spine of the book blocks with the first set of cutters removes a first layer of material from said spines and the second set of cutters successively removes a second layer of material from said spines.

7. The implement of claim 6, wherein said paths are circular paths having different radii.

8. The implement of claim 6, wherein said cutters comprise concentric annuli of tools.

9. The implement of claim 6, further comprising at least one rotary carrier for said orbiting means.

10. The implement of claim 9, wherein said one cutter is offset relative to said other cutter in the direction of said axis.

11. The implement of claim 9, wherein said cutters comprise concentric annuli of tools; means for separably coupling the tools of at least one of said cutters to said carrier.

12. The implement of claim 9, further comprising means for adjustably coupling at least one of said cutters to said carrier.

13. The implement of claim 12, wherein said at least one cutter comprises an annulus of tools having shanks and bits provided on said shanks, said coupling means comprising slots in said shanks.

14. The implement of claim 6, wherein each of said cutters includes an annulus of neighboring tools having mutually inclined cutting edges which are substantially parallel to and located behind planes that intersect said axis with respect to the direction of orbital movement of the respective cutters.

* * * * *